United States Patent
Lundsted Poulsen et al.

(10) Patent No.: US 11,719,258 B2
(45) Date of Patent: Aug. 8, 2023

(54) PUMP

(71) Applicant: GRUNDFOS HOLDING A/S, Bjerringbro (DK)

(72) Inventors: Brian Lundsted Poulsen, Langå (DK); Nielas Winther Laue, Aalborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 129 days.

(21) Appl. No.: 17/255,042

(22) PCT Filed: Jun. 19, 2019

(86) PCT No.: PCT/EP2019/066206
§ 371 (c)(1),
(2) Date: Dec. 22, 2020

(87) PCT Pub. No.: WO2020/002093
PCT Pub. Date: Jan. 2, 2020

(65) Prior Publication Data
US 2021/0180613 A1 Jun. 17, 2021

(30) Foreign Application Priority Data
Jun. 29, 2018 (EP) ..................................... 18180917

(51) Int. Cl.
*F16C 35/06* (2006.01)
*F04D 29/62* (2006.01)
(Continued)

(52) U.S. Cl.
CPC .......... *F04D 29/628* (2013.01); *F04D 1/063* (2013.01); *F04D 29/0413* (2013.01); *F05B 2240/52* (2013.01)

(58) Field of Classification Search
None
See application file for complete search history.

(56) References Cited

U.S. PATENT DOCUMENTS 1,902,095 A * 3/1933 Parsons ................... F04D 25/02
74/411
2,016,831 A * 10/1935 Havill ...................... F04D 17/00
415/143

(Continued)

FOREIGN PATENT DOCUMENTS

CA 2910163 A1 4/2016
CN 202811483 U 3/2013
(Continued)

*Primary Examiner* — Kayla Mccaffrey
(74) *Attorney, Agent, or Firm* — McGlew and Tuttle, P.C.

(57) ABSTRACT

The present disclosure refers to a pump (1) comprising
a rotor shaft (13) extending along a rotor axis (R),
a bearing body (19) circumferentially encompassing the rotor shaft (13) and comprising a radially outer bearing surface (32), and
a locking ring (25) circumferentially encompassing the rotor shaft (13) and limiting an axial movement of the bearing body (19) relative to the rotor shaft (13),
wherein the locking ring (25) comprises at least two radially inwardly protruding teeth (49, 51, 53, 55), wherein the locking ring (25) is radially expandable from a locking state to a mounting state against an elastic restoring force of the locking ring (25), wherein the locking ring (25) is, in the mounting state, positionable at a desired axial position on the rotor shaft (13), wherein the teeth (49, 51, 53, 55) are configured to press, in the locking state, against a radial outer surface (31) of the rotor shaft (13) by the elastic restoring force of the locking ring (25).

17 Claims, 11 Drawing Sheets

(51) Int. Cl.
*F04D 1/06* (2006.01)
*F04D 29/041* (2006.01)

(56) References Cited

U.S. PATENT DOCUMENTS

| | | | | |
|---|---|---|---|---|
| 2,595,787 | A * | 5/1952 | Heimann | F16B 21/18 |
| | | | | 285/321 |
| 2,660,122 | A * | 11/1953 | Landberg | F04D 1/006 |
| | | | | 416/244 R |
| 2,688,930 | A * | 9/1954 | De Moss | F04D 29/2227 |
| | | | | 415/141 |
| 3,595,123 | A * | 7/1971 | Wurzel | F16B 21/186 |
| | | | | 411/517 |
| 4,257,753 | A * | 3/1981 | Sakamaki | F04C 15/0042 |
| | | | | 418/153 |
| 4,421,456 | A * | 12/1983 | Huffman | F04D 29/126 |
| | | | | 415/231 |
| 5,127,764 | A * | 7/1992 | Baer | F16B 21/186 |
| | | | | 411/522 |
| 5,197,841 | A * | 3/1993 | Tanaka | B25B 27/20 |
| | | | | 411/522 |
| 5,201,848 | A | 4/1993 | Powers | |
| 5,385,413 | A * | 1/1995 | Murphy | F16C 33/60 |
| | | | | 384/585 |
| 5,462,369 | A * | 10/1995 | Layne | F16C 35/063 |
| | | | | 384/903 |
| 5,630,671 | A * | 5/1997 | Larson | F16C 35/063 |
| | | | | 384/537 |
| 8,747,014 | B2 * | 6/2014 | Raszkowski | F16H 57/0031 |
| | | | | 403/372 |
| 10,641,339 | B2 * | 5/2020 | Heuberger | F16C 19/06 |
| 2007/0003406 | A1 * | 1/2007 | Racer | F04D 29/628 |
| | | | | 415/111 |

FOREIGN PATENT DOCUMENTS

| | | |
|---|---|---|
| CN | 203297144 U | 11/2013 |
| GB | 1286613 A | 8/1972 |
| WO | 2015008224 A1 | 1/2015 |

* cited by examiner

PUMP

TECHNICAL FIELD

The present disclosure is directed to a pump, in particular to a single stage or multistage centrifugal pump with a power of up to 300 kW.

BACKGROUND

Single stage or multistage centrifugal pumps usually comprise at least one impeller fixed to a rotor shaft driven by a motor. The rotor shaft is immersed in the fluid to be pumped and/or extends into a pump housing. The rotor shaft is usually centred by a radial bearing within the pump housing. In particular for large shafts of big pumps, it is a challenge to quickly and reliably mount the bearing to the rotor shaft.

It is known to mount the bearing to the rotor shaft by means of a flange connection. Such known solutions consume significant time and material for mounting the radial bearing to the rotor shaft.

SUMMARY

In contrast to such solutions, embodiments of the present disclosure provide a pump for which the radial bearing can be quickly and reliably mounted to the rotor shaft with less material.

In accordance with the present disclosure, a pump is provided comprising
- a rotor shaft extending along a rotor axis,
- a bearing body circumferentially encompassing the rotor shaft and comprising a radially outer bearing surface, and
- a locking ring circumferentially encompassing the rotor shaft and limiting an axial movement of the bearing body relative to the rotor shaft, wherein the locking ring comprises at least two radially inwardly protruding teeth, wherein the locking ring is radially expandable from a locking state to a mounting state against an elastic restoring force of the locking ring, wherein the locking ring is, in the mounting state, positionable at a desired axial position on the rotor shaft, wherein the teeth are configured to press, in the locking state, against a radial outer surface of the rotor shaft by the elastic restoring force of the locking ring.

The locking ring thus serves as a "snap ring" without needing a prefabricated groove in the shaft to snap into. The teeth concentrate the normal forces exerted by the elastic restoring force of the locking ring between the locking ring and the radial outer surface of the rotor shaft on a small arear so that there is a high pressure between teeth and the radial outer surface of the rotor shaft. This high pressure provides for sufficient frictional force to axially fix the locking ring to the shaft. The locking ring thus facilitates a quick and reliable mounting of the radial bearing to the rotor shaft without a flange connection. Over time and use, and particularly in an abrasive environment of the fluid to be pumped, the teeth of the locking ring, when in the locking state, may even impress or cut into the surface of the rotor shaft and thereby, at the desired axial position, may create grooves for the teeth to engage with. Such created grooves provide for a positive-fit in addition to the frictional force for securing the locking ring axially to the rotor shaft.

Optionally, the pump may further comprise a first axial stop body and a second axial stop body, wherein the first axial stop body is the locking ring. The bearing body is thus fully axially locked between the two axial stop surfaces. Optionally, the pump may further comprise an impeller nut encompassing the rotor shaft for fixing an impeller to the rotor shaft, wherein the impeller nut is the second axial stop body.

[07] Optionally, the second axial stop body may define $N \geq 1$ engagement location(s) for preventing a rotational movement of the bearing body relative to the rotor shaft, wherein the bearing body comprises a first axial end facing the locking ring and a second axial end facing away from the locking ring, wherein the second axial end comprises $N \geq 1$ engagement location(s) positive-locking with the engagement location(s) of the second axial stop body. These positive-locking engagement location(s) thus prevent a rotational movement of the bearing body relative to the rotor shaft. Optionally, the second axial stop body and the second axial end of the bearing body may comprise $N \geq 2$ engagement locations, wherein the engagement locations are arranged in an N-fold symmetry with respect to the rotor axis. "N-fold symmetry" shall mean herein "N evenly distributed locations along the circumference", e.g. N=2 locations would have an angular distance of 180° to each other, i.e. at diametral opposite sides, whereas N=3 locations would have an angular distance of 120° to each other. The N-fold symmetric arrangement of engagement locations provides for N different angular orientation options how the bearing body can be mounted to the rotor shaft. This may be beneficial to find the best positive fit among the N options for being less prone to manufacturing tolerances.

Optionally, a first one of the engagement locations may be configured fora positive-locking fit having a lower tolerance in tangential and/or axial direction than a second one of the engagement location(s). This means that the second engagement location has a has larger clearance or "wiggle room" between the bearing body and the second axial stop body in tangential and/or axial direction. The first one of the engagement locations may be considered as the designated "best" positively fitting engagement location. The other engagement location(s) may be considered as auxiliary engagement locations for backing the prevention of rotational movement of the bearing body relative to the rotor shaft in case the first engagement location wears out.

Optionally, at least said first engagement location at the second axial stop body and/or the second axial end of the bearing body may comprise a convex axial contact surface for providing the only axial contact between the bearing body and the second axial stop body. The convex axial contact surface thereby provides a well-defined point of axial contact for the bearing body.

Optionally, the locking ring may define a circumferential gap between a first circumferential end portion of the locking ring and a second circumferential end portion of the locking ring, wherein the gap is smaller in the locking state than in the mounting state. The locking ring with the gap provides for a certain resilient flexibility to be widened into the mounting state.

Optionally, the locking ring may comprise a security hook extending from the first circumferential end portion and overlapping the circumferential gap, wherein the security hook is configured to hook into the second circumferential end portion of the locking ring for preventing, in the mounting state, a further radial expansion of the locking ring. The security hook may thus prevent an over-expansion of the locking ring into a plastic deformation. A plastic deformation should be avoided, because it would reduce the elastic restoring force of the locking ring for pressing the teeth against the shaft surface. A tool may be used to widen the locking ring into the mounting state. Alternatively, or in addition to the security hook, the tool may comprise means for preventing an over-expansion of the locking ring.

Optionally, the locking ring may comprise a stress portion between a first circumferential end portion of the locking ring and a second circumferential end portion of the locking ring, wherein the annulus area of the locking ring reduces from the stress portion towards the first circumferential end portion and towards the second circumferential end portion. In other words, the radial thickness of the locking ring may reduce towards the gap between the circumferential end portions. The radially thicker stress portion may provide structural stability and the radially thinner circumferential end portions may provide structural elasticity both facilitating resilient elastic deformation between the mounting state and the locking state.

Optionally, the locking ring may define an envelope of maximal radial expansion, wherein the maximal radial expansion is equal to or smaller than the radius of the radially outer bearing surface. Thereby, the rotor shaft can be mounted to the pump as a pre-assembled unit with the bearing body being fixed to the rotor shaft by means of the locking ring.

Optionally, each of the teeth of the locking ring may form an inward blade. Such blades may cut grooves into the rotor shaft surface, wherein the grooves extend essentially perpendicular to the rotor axis. Such blades may be sharpened inwardly to increase the frictional contact and/or to facilitate the cutting of grooves.

[15] Optionally, the teeth may be located at M≥2 locking ring segments with a central angle of $30°≤α≤90°$, wherein the locking ring segments are preferably arranged symmetrically with respect to a symmetry plane spanned by the rotor axis and a direct virtual connecting line between the center of the circumferential gap and the center of the stress portion, and wherein the circumferential gap is preferably located centrally in one of the locking ring segments. There may thus be M≥2 tooth-free segments, each located between two neighboring locking ring segments of said M≥2 locking ring segments having teeth. Thereby, the teeth may be arranged at those locations of the locking ring, where the elastic restoring force provides the highest normal force on the rotor shaft surface to press the teeth against the rotor shaft surface.

Optionally, the locking ring may comprise a first one of the teeth at a first circumferential end portion of the locking ring and a second one of the teeth at a second circumferential end portion of the locking ring, wherein the first tooth and the second tooth preferably extend over an arc length with a central angle β of less than 10°. The optimal length of the teeth may be a compromise between their ability to exert a force on the rotor shaft and their structural stability to secure the bearing body axially.

The shorter they are the better, i.e. with higher pressure, they may press against the rotor shaft. The longer they are the more locking ring material actually participates in the axial locking function. A range of arc length teeth between 5° and 10° was found to be a good compromise.

Optionally, the locking ring may comprise a third one of the teeth and a fourth one of the teeth at a stress portion between the first circumferential end portion of the locking ring and the second circumferential end portion of the locking ring, wherein the third tooth and the fourth tooth each preferably extend over an arc length with a central angle γ of less than 60°. The third and fourth tooth may have the same arc length as the first and second tooth, e.g. 5°-10°.

However, the normal forces provided at the radially thicker stress portion may be higher so that the third tooth and the fourth tooth are preferably longer to involve more material in the axial locking function while pressing against the rotor shaft surface with a similar pressure as the first tooth and the second tooth. It is desired that the pressure with which the teeth press against the rotor shaft is about the same for all teeth even if the teeth differ in size and/or length and/or shape.

Optionally, the pump may be a single stage or multistage centrifugal pump for pumping a fluid, wherein the fluid to be pumped serves as a lubricant on the radially outer bearing surface of the bearing body.

Optionally, the pump may be a single stage or multistage centrifugal pump for pumping a fluid, wherein the locking ring is configured to be bathed in the fluid to be pumped so that the fluid provides an abrasive environment facilitating, in the locking state, an impressing of the teeth of the locking ring into the radial outer surface of the rotor shaft.

[20] The teeth may be harder than the surface of the rotor shaft. This facilitates the impressing of grooves into the surface of the rotor shaft by the teeth of the locking ring. For instance, the teeth and/or the whole locking ring with the teeth being an integral part thereof may be made of stainless steel, e.g. EN 1.4410 (Alloy 2507; X 2 CrNiMoN 25-7-4), which is highly resistant to crevice corrosion, erosion corrosion and corrosion fatigue under tension. The rotor shaft and/or the rotor shaft surface may be made of another type of stainless steel, e.g. EN 1.4462 (Alloy 2205; X 2 CrNiMoN 22-5-3), which is also highly resistant to erosion corrosion, but slightly softer than the teeth of the locking ring. The hardness made be determined in terms of Vickers hardness number (HV) as set forth in DIN EN ISO 6507. The teeth may thus have a hardness of HV 290, whereas the rotor shaft surface may have a hardness of HV≤270.

SUMMARY OF THE DRAWINGS

Embodiments of the present disclosure will now be described by way of example with reference to the following figures of which.

DETAILED DESCRIPTION

Figure 1:
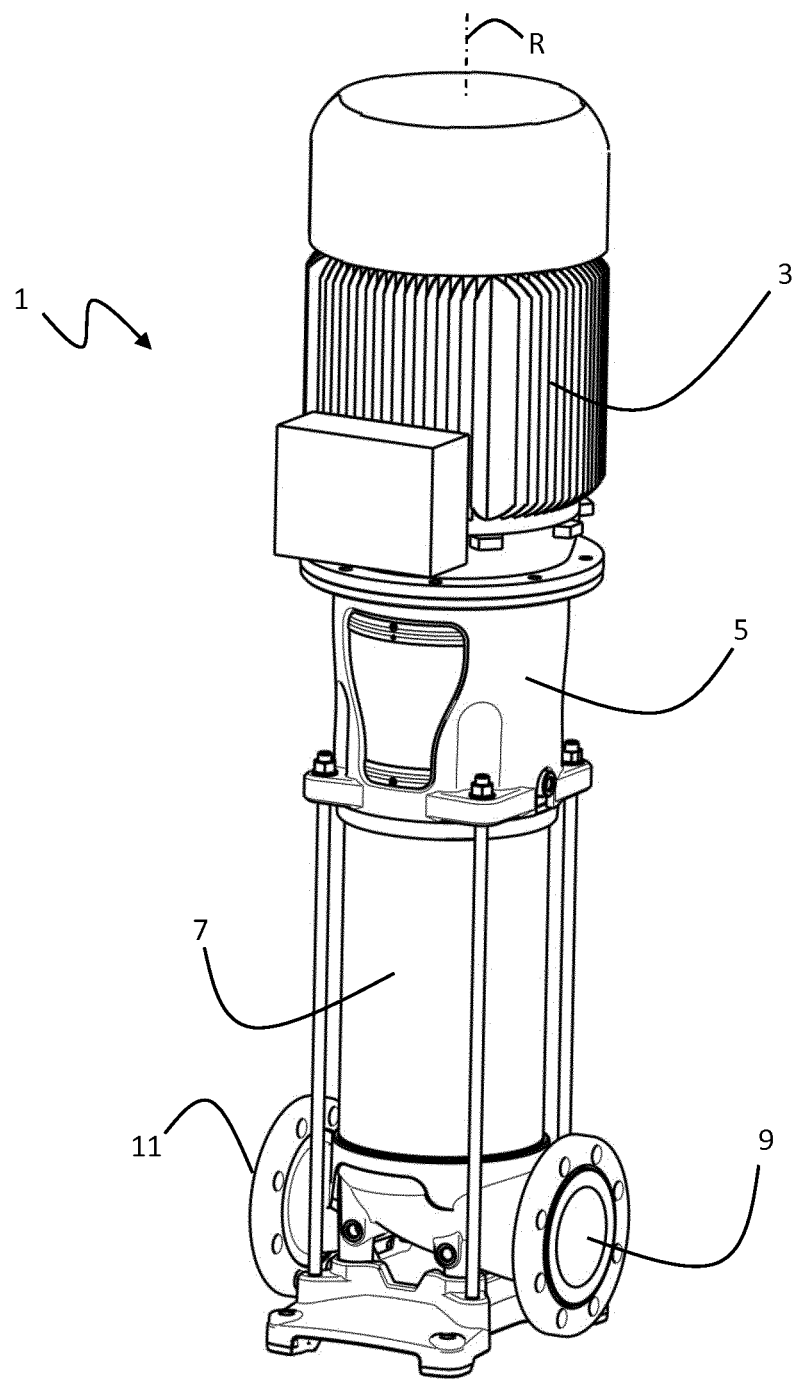
FIG. 1 shows a perspective view on a pump according to an example of an embodiment of the present disclosure.

FIG. 1 shows a big multistage centrifugal pump 1 with a 75 kW electric motor in an upright standing vertical configuration. The motor is located in a motor housing 3 being mounted on a motor stool 5, sometimes referred to as lantern, located between the motor housing 3 and a pump housing 7. A rotor shaft (not visible in FIG. 1) extends along a vertical rotor axis R from the motor through the motor stool 5 into the pump housing 7, where a stack of impellers (not visible in FIG. 1) is mounted to the rotor shaft. When the pump 1 is connected with its inlet 9 and outlet 11 to a pipe system, the impellers are immersed into the fluid to be pumped. The motor drives the rotor shaft with the impellers to convey fluid from the inlet 9 to the outlet 11. The rotor shaft is radially held in position within the pump 1 by one or more radial bearings circumferentially encompassing the rotor shaft in order to allow for low-friction rotation of the rotor shaft. The fluid to be pumped, e.g. water, may serve here as a lubricant on a radially outer bearing surface of the radial bearing(s). The radial bearing(s) and/or the radially outer bearing surface may comprise ceramic material for low-friction.

Figure 2:
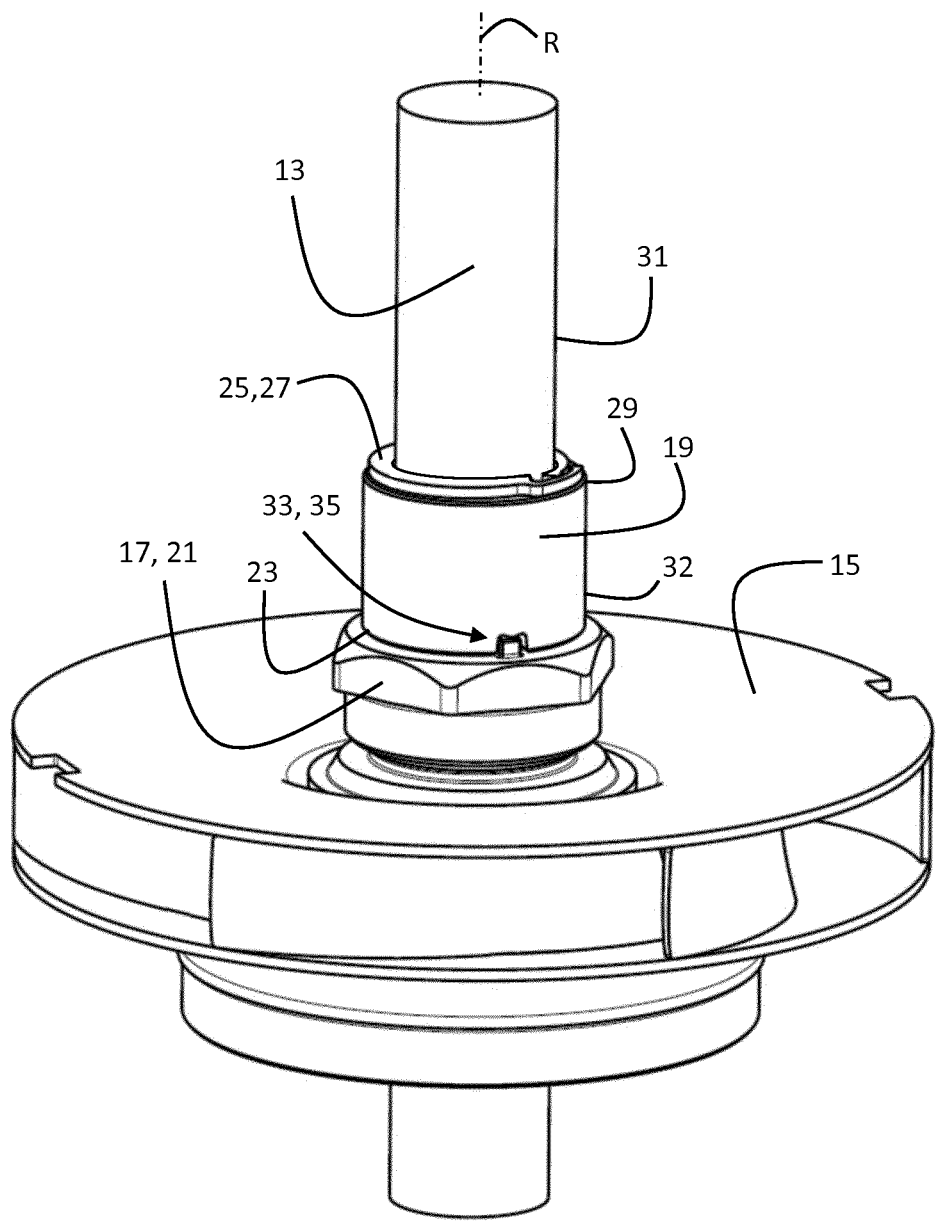
FIG. 2 shows a perspective view on a section of a rotor shaft with assembled impeller, impeller nut, bearing body and locking ring as parts of a pump according to an example of an embodiment of the present disclosure.

FIG. 2 gives a better view on a section of a rotor shaft 13 with an impeller 15 mounted to it by way of an impeller nut 17. The impeller nut 17 comprises an inner thread screwed on an outer thread at the impeller 15. The impeller nut 17 comprises a portion of hexagonal cross-sectional shape for a spanner or wrench to engage with for screwing. By tightening the impeller nut 17, the impeller 15 and the impeller nut 17 are axially and rotationally fully fixed to the rotor shaft 13.

A bearing body 19 circumferentially encompasses the rotor shaft 13 axially above the impeller nut 17. Thereby, the bearing body 19 rests on the impeller nut 17. The impeller nut 17 thus forms an axial stop body 21 for an axial bottom end 23 of the bearing body 19. In order to fully axially fix the bearing body 19, a locking ring 25 circumferentially encompasses the rotor shaft 13 axially above bearing body 19. The locking ring 25 is an axial stop body 27 for an axial top end 29 of the bearing body 19. The bearing body 19 is thus axially fixed between the two axial stop bodies 21, 27.

The locking ring 25 comprises at least two radially inwardly protruding teeth (see FIGS. 6, 7 and 8a,b), which are configured to press against a radial outer surface 31 of the rotor shaft 13 by the elastic restoring force of the locking ring 25. Thereby, the locking ring 25 is fixed by a frictional force and preferably by a positive-fit with impressed grooves against axial displacement when it is in a locking state as shown in FIG. 2. However, it should be noted that the rotor shaft 13 does not comprise a pre-fabricated circumferential groove for the locking ring 25 to engage with. The teeth of the locking ring 25 press against the radial outer surface 31 of the rotor shaft 13 and may thereby create grooves to positively engage with over time and use. The locking ring 25 is radially expandable from the shown locking state to a widened mounting state against an elastic restoring force of the locking ring 25. The teeth of the locking ring 25 are, in the widened mounting state, disengaged from the rotor shaft 13 so that the locking ring 25 in then positionable at a desired axial position on the rotor shaft 13. This allows an easy mounting and dismounting of the locking ring 25 and the bearing body 19.

The bearing body 19 is not rotationally fixed by the locking ring 25 or the rotor shaft 13, but by means of at least one engagement location 33 at the axial bottom end 23 of the bearing body 19. The engagement location 33 is here a female recess in the axial bottom end 23 of the bearing body 19 being engaged in a positive form-fit with a correspondingly formed engagement location 35 in form of a male axial protrusion at the axial stop body 21, i.e. the impeller nut 17. Alternatively, the engagement location 33 may be a male axial protrusion in the axial bottom end 23 of the bearing body 19 being engaged in a positive form-fit with a correspondingly formed engagement location 35 in form of a female recess at the axial stop body 21, i.e. the impeller nut 17. The engagement locations 33, 35 prevent a rotational movement of the bearing body 19 relative to the rotor shaft 13.

Figure 3:
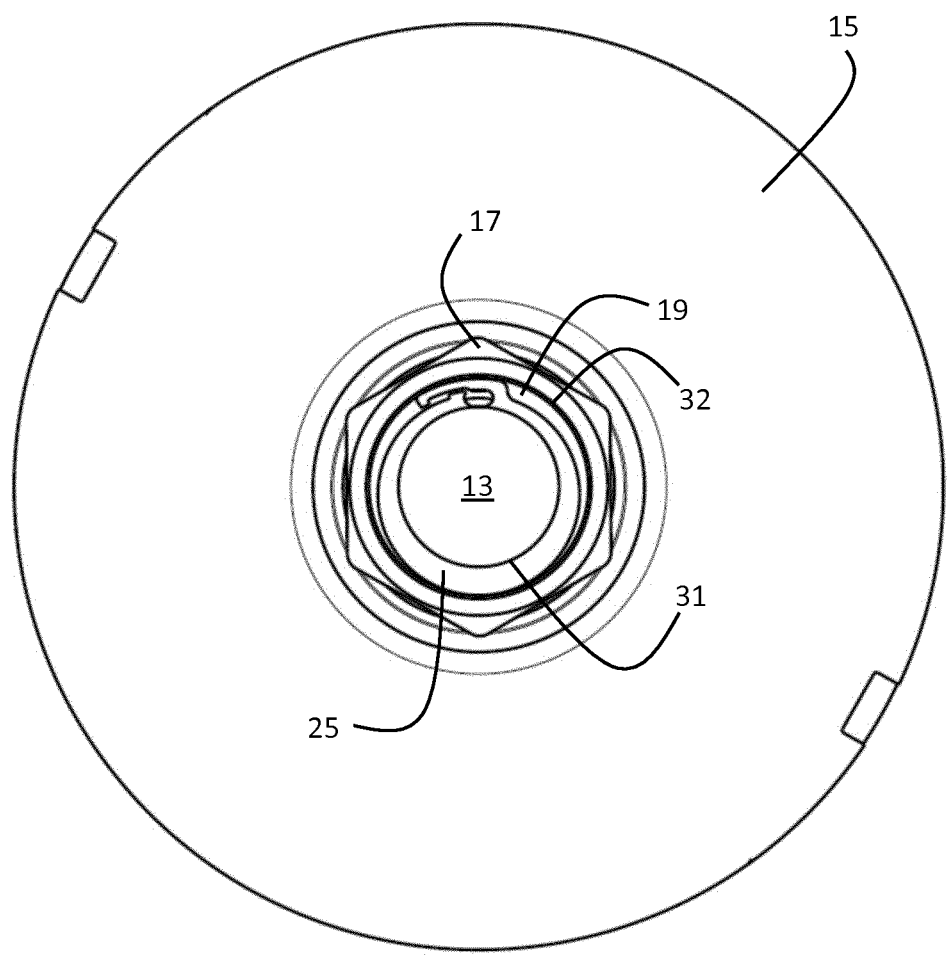
FIG. 3 shows a top view on a section of a rotor shaft with assembled impeller, impeller nut, bearing body and locking ring as parts of a pump according to an example of an embodiment of the present disclosure.

The top view of FIG. 3 illustrates nicely that the radially outer contour of the locking ring 25 does not radially extend the radius of a radial outer bearing surface 32. In other words, the locking ring 25 defines an envelope of maximal radial expansion, wherein the maximal radial expansion is equal to or smaller than the radius of the radially outer bearing surface 32.

Thereby, the locking ring 25 does not impede or complicate mounting or dismounting of the rotor shaft 13 together with the impeller 15 and the bearing body 19 as a pre-assembled unit into or out of the pump 1.

Figure 4:
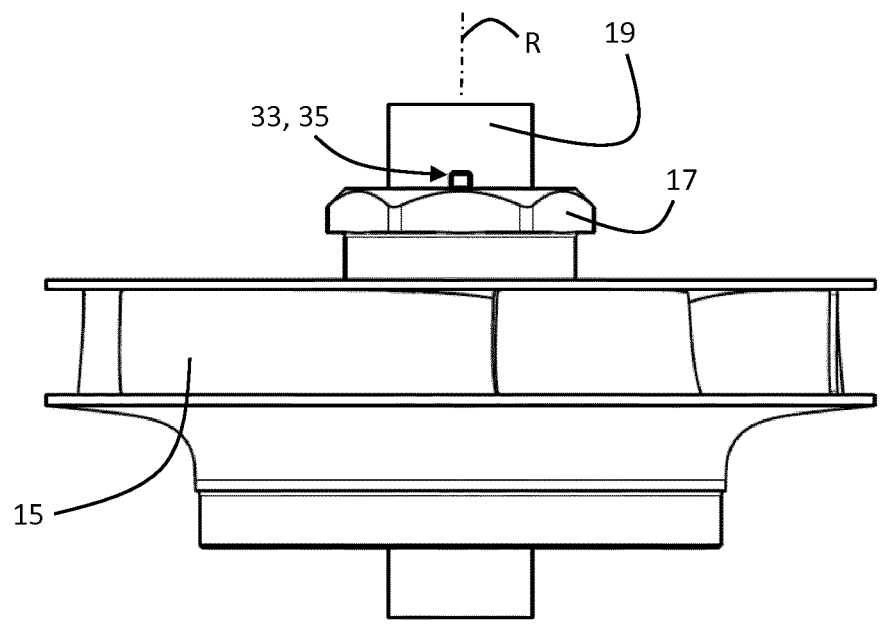
FIG. 4 shows a side view on a section of a rotor shaft with assembled impeller, impeller nut, bearing body and locking ring as parts of a pump according to an example of an embodiment of the present disclosure.
Figure 5:
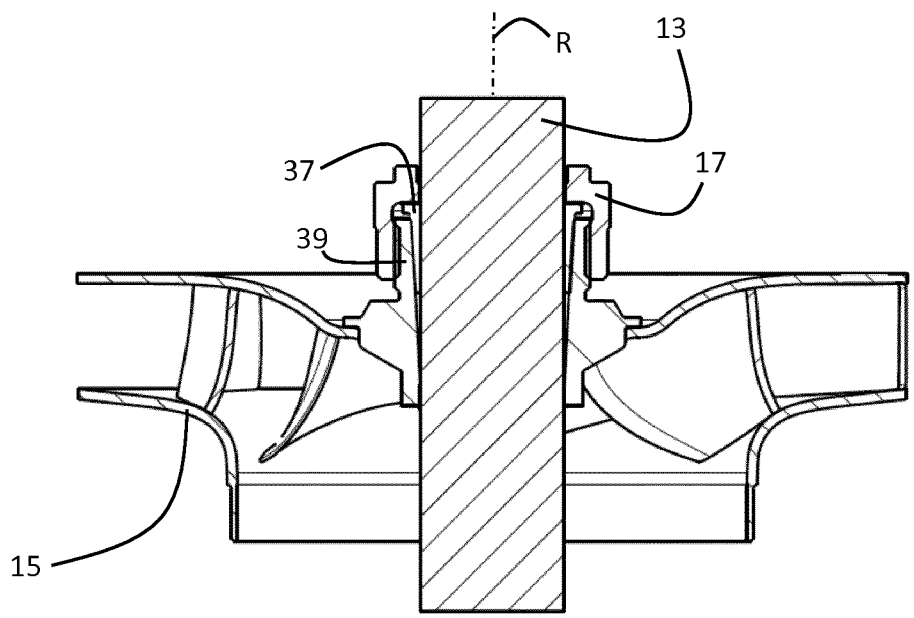
FIG. 5 shows a longitudinal cut view on a section of a rotor shaft with assembled impeller, impeller nut, bearing body and locking ring as parts of a pump according to an example of an embodiment of the present disclosure.

FIGS. 4 and 5 show the impeller nut 17 fixes the impeller 15 to the rotor shaft 13 by frictional force. By tightening the impeller nut 17 onto an upper threaded portion 39 of the impeller 15, an inner wedge element 37 is pushed downward and squeezed between the upper threaded portion of the impeller 15 and the rotor shaft 13. The radial normal forces between rotor shaft 13, wedge element 37, upper threaded portion of impeller 15 and the impeller nut 17 are then high enough to provide a secure connection by frictional force. It should be noted that the axial positioning of the impeller 15 is adjustable to the desired position. In combination with the locking ring 25 that does not require any specific feature at the rotor shaft 13 to be fixed thereto, the assembly is more "resilient" or less prone to manufacturing tolerances. The axial position of the impeller 15 and the bearing body 19 can be chosen as seem best fit relative to other parts of the pump 1.

Figure 6:
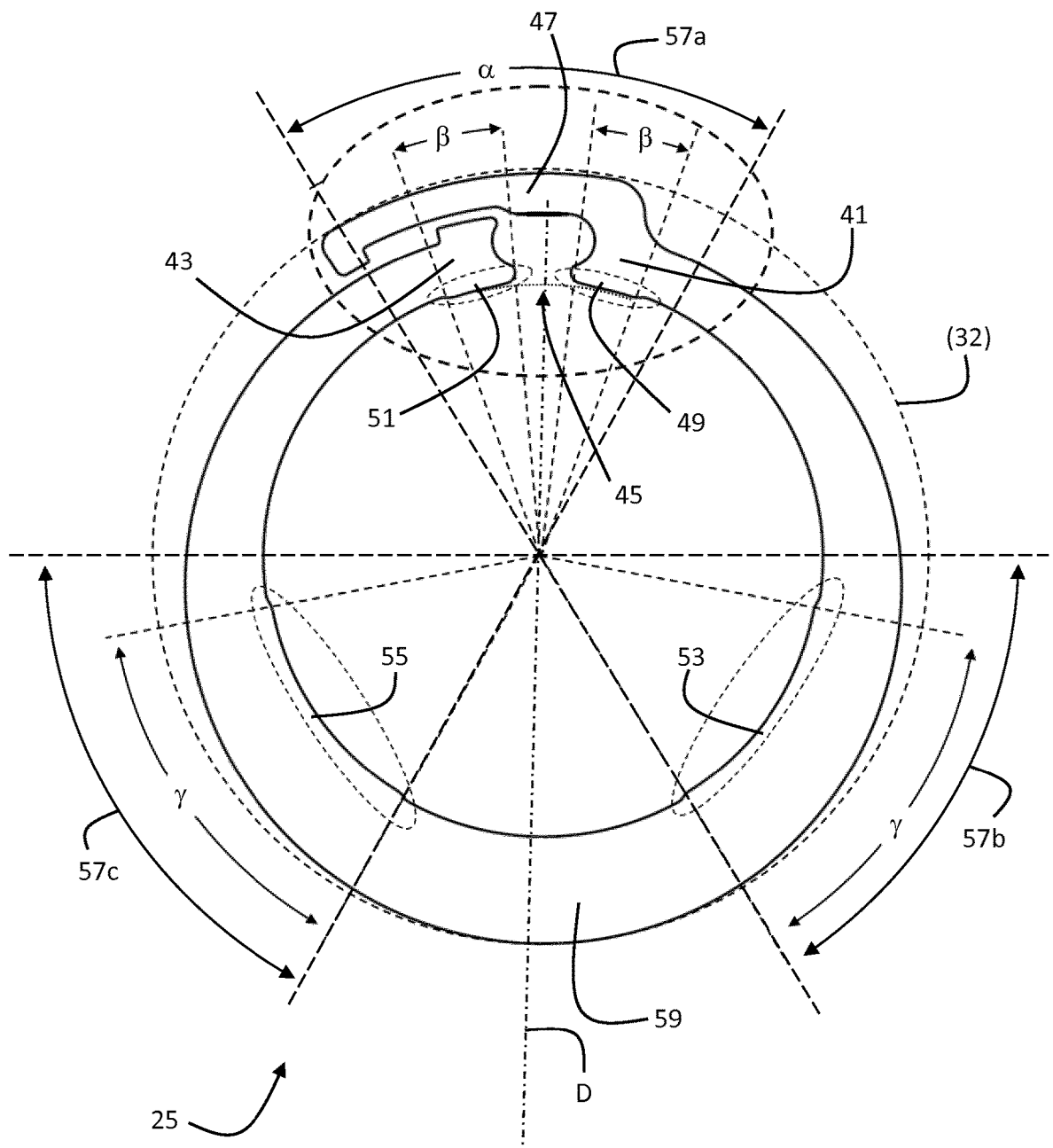
FIG. 6 shows a top view on a first embodiment of the locking ring as part of a pump according to an example of an embodiment of the present disclosure.

FIG. 6 shows a first embodiment of the locking ring 25 in more detail. The locking ring 25 is not circumferentially closed, but comprises two circumferential end portions 41, 43 defining a gap 45 therebetween. The locking ring 25 is shown in a relaxed state of minimal radial expansion with a minimal width of the gap 45. The locking ring 25 can be widened, e.g. by a tool, into a mounting state in which the locking ring 25 may be put onto the rotor shaft 13. The locking ring 25 is not flexible enough to open the gap 45 wider than the diameter of the rotor shaft 13 so that the locking ring could be "clicked" sideways onto the rotor shaft 13. However, the widened locking ring 25 in the mounting state can be slipped over the rotor shaft 13 from one axial end into the desired axial position to axially fix the bearing body 19. The maximal expansion in the mounting state is limited by structural constraints not to reach a point of plastic deformation. It has shown that the gap 45 may approximately be doubled in width to stay within a region of essentially elastic deformation in which the elastic restoring force of the locking ring is able to essentially fully restore the relaxed state of minimal radial expansion as shown in FIG. 6. In order to prevent a wider expansion into a plastic deformation, a security hook 47 extends from the first circumferential end portion 41 and overlaps the circumferential gap 45. The security hook 47 hooks into the second circumferential end portion 43 of the locking ring 25 for preventing, in the mounting state, a further radial expansion of the locking ring 25. The length of the security hook 47 thereby defines the maximal width of the gap 45. The locking state of the locking ring 25 is somewhere between the relaxed state as shown in FIG. 6 and a widened mounting state allowing to axially move the locking ring 25 along the rotor shaft 13. When slipped over the rotor shaft 13, the locking ring 25 cannot fully relax as shown in FIG. 6, but will always be under tension of its elastic restoring force.

The locking ring 25 comprises four radially inwardly protruding teeth 49, 51, 53, 55, wherein a first tooth 49 is located at the first circumferential end portion 41 and a second tooth 51 is located at the second circumferential end portion 43. The first tooth 49 and the second tooth 51 have essentially the same size and shape. They extend in form of inward blades over an arc length with a central angle β of less than 20°, here 13°. A third tooth 53 and a fourth tooth 55 are longer and extend in form of inward blades over an arc length with a central angle β of less than 60°, here 48°. The third tooth 53 and a fourth tooth 55 are located at a circumferential position such that their angular distance to each other is about the same as their angular distance to the first tooth 39 and the second tooth 51, respectively. Thus, the teeth 49, 51, 53, 55 are located at three locking ring segments 57a,b,c each with a central angle α of 60° arranged in a three-fold symmetry with respect to the rotor axis R. The 60° segments between the locking ring segments 57a,b,c comprise no teeth. The gap 45 is located centrally in one 57a of the locking ring segments 57a,b,c. The position and length of the teeth 49, 51, 53, 55 are thus optimised for pressing effectively against the rotor shaft surface 31.

The radial width of the locking ring 25 reduces towards the gap 45. The locking ring 25 thus comprises a radially thicker stress portion 59 between the radially thinner circumferential end portions 41, 43. In other words, the annulus area of the locking ring 25 reduces from the stress portion 59 towards the circumferential end portions 41, 43. The stress portion 59 provides for the structural stability and a large fraction the elastic restoring force of the locking ring 25. In addition, the radially thinner circumferential end portions 41, 43 allow for the security hook 47 to be placed within an envelope of maximal radial expansion that is equal to or smaller than the radius of the radially outer bearing surface 32.

Figure 7:
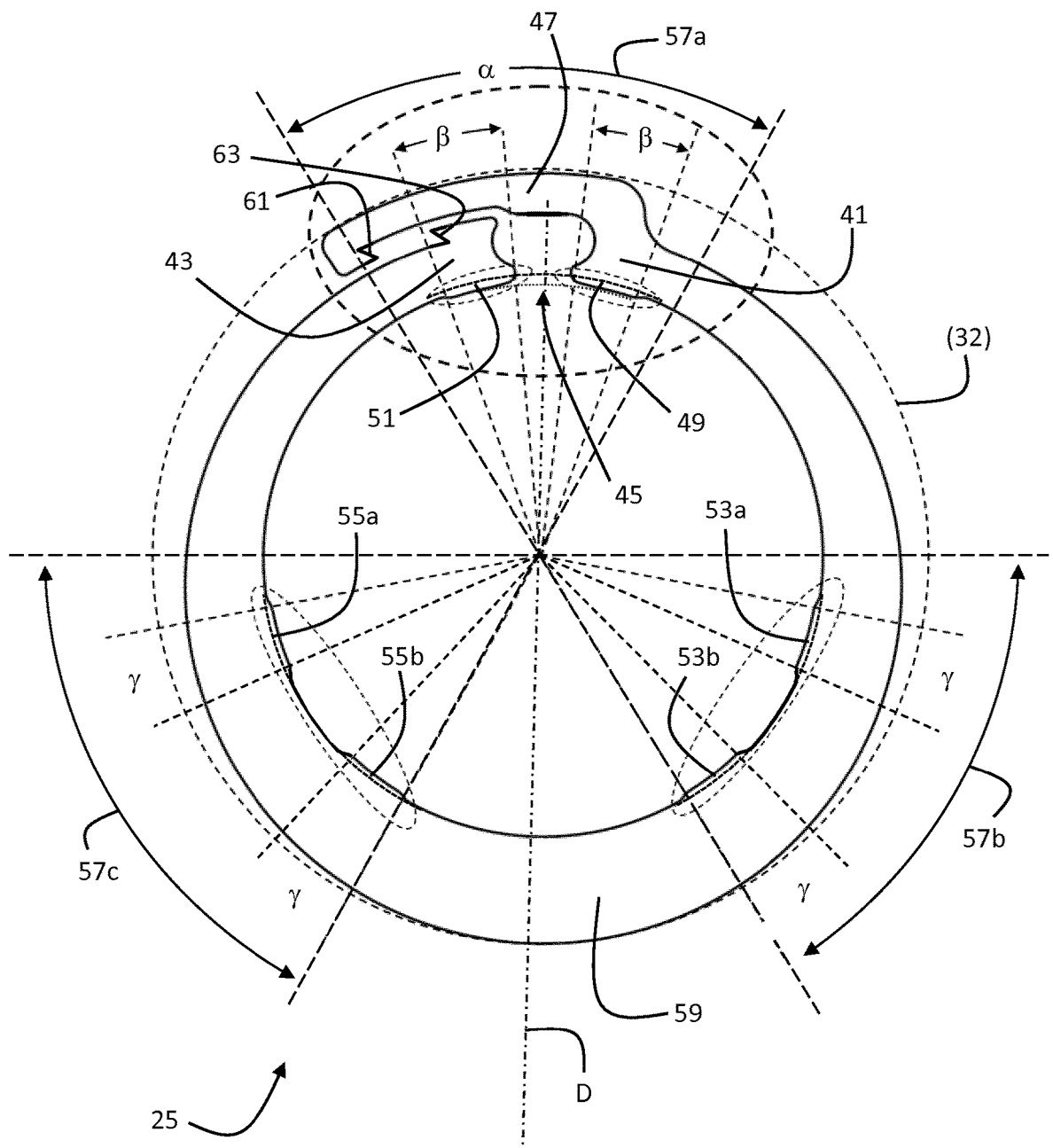
FIG. 7 shows a top view on a second embodiment of the locking ring as part of a pump according to an example of an embodiment of the present disclosure.

FIG. 7 shows a second embodiment of the locking ring 25 that differs in two separate and independent aspects from the first embodiment shown in FIG. 6. The first aspect is that the security hook 47 and the second circumferential end portion 43 comprise correspondingly inclined surfaces 61, 63 that are configured to engage with each other in the widened mounting portion so that the security hook 47 safely engages with the second circumferential end portion 43. The safety hook 47 cannot slip off by a radially outward deformation, because the mutually engaging inclined surfaces 61, 63 prevent radial separation.

The second aspect in which the embodiment shown in FIG. 7 differs from the embodiment shown in FIG. 6 is that the third tooth 53 and fourth tooth 55 are actually formed by pair of teeth 53a,b and 55a,b, wherein each of the teeth 53a, 53b, 55a, 55b has a similar arc length as the first tooth 49 and the second tooth 51. Various arrangements of teeth may be possible here. Alternatively or in addition, there could be a plurality of teeth distributed at the radially inner side of the locking ring 25, wherein it is advantageous to have M≥2 segments without any teeth between M≥2 segments that comprise teeth.

Figure 8A:
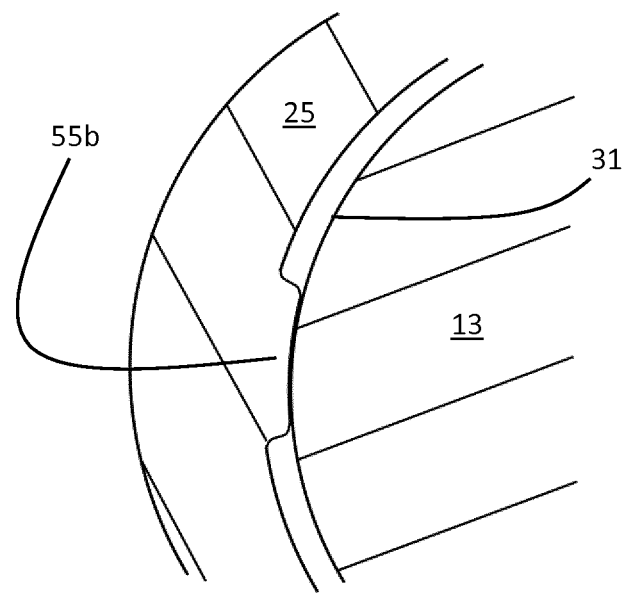
FIGS. 8a,b show detailed top views illustrating how the teeth of a locking ring may impress into the rotor shaft surface according to an example of an embodiment of the present disclosure.
Figure 8B:
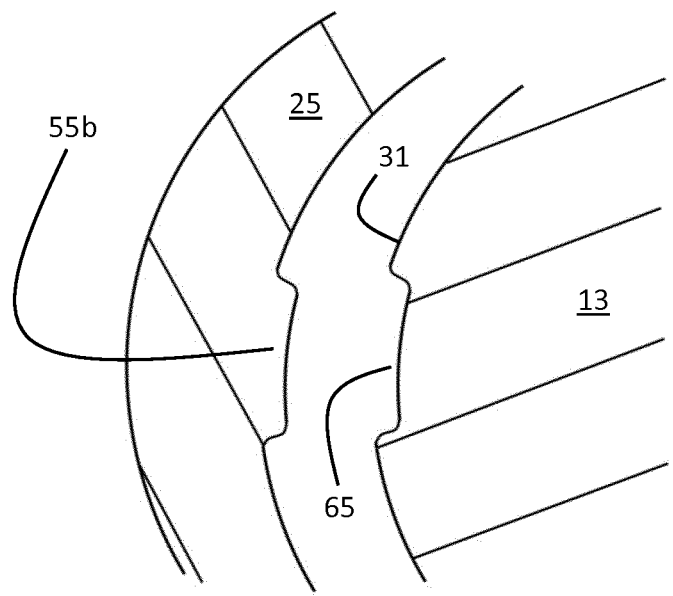

FIGS. 8a and 8b illustrate how a tooth 55b presses against the rotor shaft surface 31. FIG. 8a shows the locking ring 25 in a locking state preventing an axial displacement of the locking ring 25 along the rotor shaft 13 by frictional force between the tooth 55b and the rotor shaft surface 31. There is no pre-fabricated groove in the rotor shaft surface 31 for the locking ring 25 to engage with. FIG. 8b shows the the locking ring 25 in a mounting state after it has been used over some time in the locking state during which it has impressed the tooth 55b into the rotor shaft surface 31. The rotor shaft surface 31 was thereby plasticly deformed so that a groove 65 remains in the rotor shaft surface 31 even after the locking ring 25 is expanded for demounting into the mounting state as shown in FIG. 8b. In the not shown locking state, the groove 65 and the tooth 55b are engaged with each other in a positive form-fit.

Figures 9, 10:
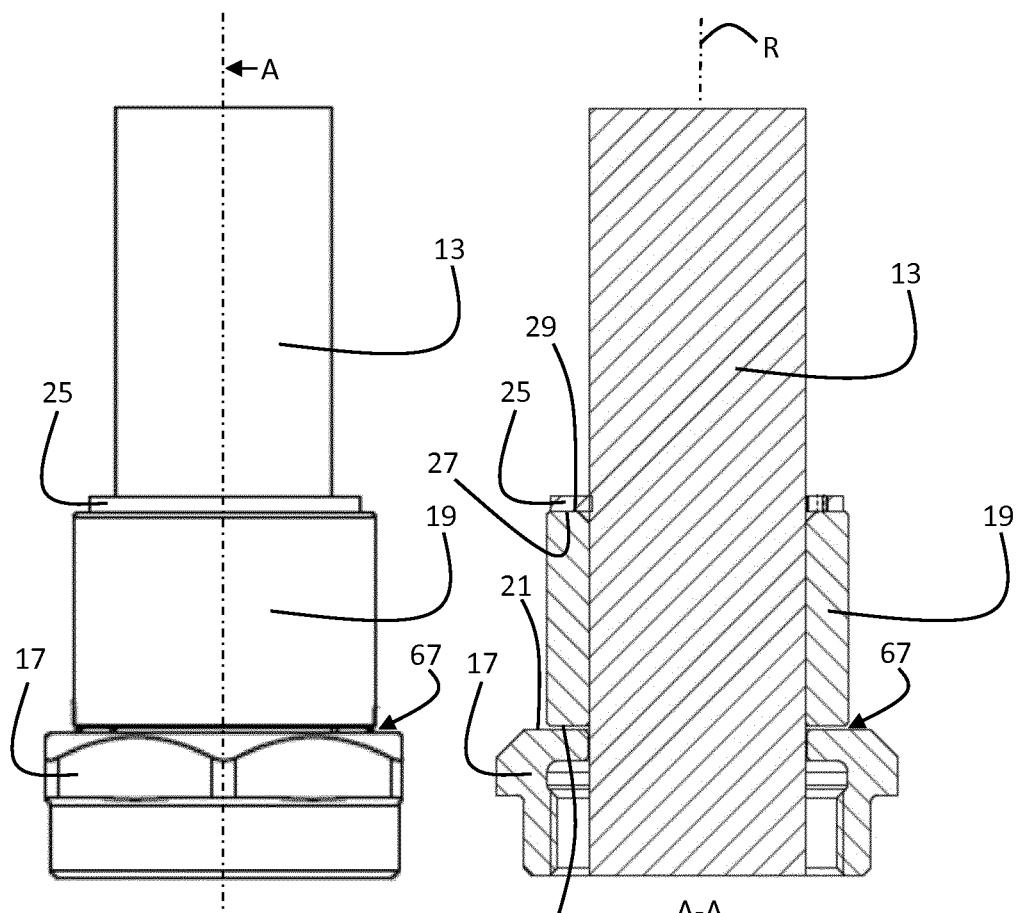
FIG. 9 shows a side view on a section of a rotor shaft with assembled, impeller nut, bearing body and locking ring as parts of a pump according to an example of an embodiment of the present disclosure.
FIG. 10 shows a longitudinal cut view on the plane A-A as indicated in FIG. 9.

FIGS. 9 and 10 show that there is small axial gap 67 between the axial bottom end 23 of the bearing body 19 and the axial top face of the impeller nut 17. There is very low tolerance fit radially between the bearing body 19 and the rotor shaft 13, but the small axial gap 67 allows for higher tolerances in terms of axial alignment. For instance, the axial top face of the impeller nut 17 may not be precisely perpendicular to the rotor axis R.

Figures 11, 12:
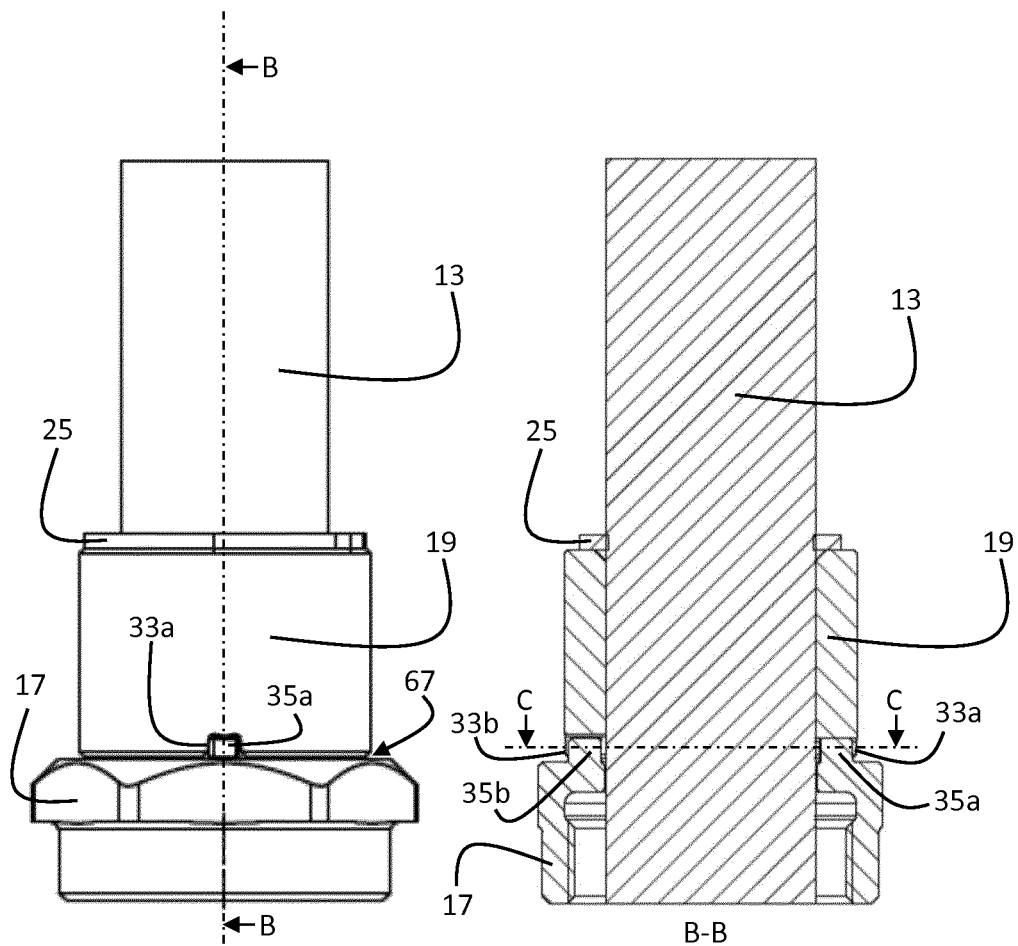
FIG. 11 shows another side view on a section of a rotor shaft with assembled, impeller nut, bearing body and locking ring as parts of a pump according to an example of an embodiment of the present disclosure.
FIG. 12 shows a longitudinal cut view on the plane B-B as indicated in FIG. 11.
Figure 13:
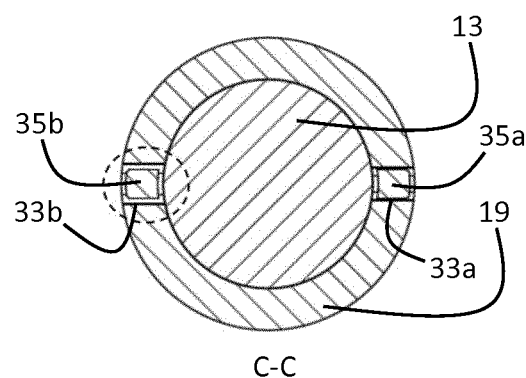
FIG. 13 shows a cross-sectional cut view on the plane C-C as indicated in FIG. 12.

FIGS. 11, 12 and 13 shows that there are two pairs of engagement locations 33a,b, 35a,b located at diametrical opposite sides of the axial bottom end 23 of the bearing body 19 and the axial top face of the impeller nut 17. A first one 33a,35a of these pairs of engagement locations 33a,b, 35a,b has a tighter positive-locking fit, i.e. it has a lower tolerance in both tangential and axial direction. In this case, the axial female recess 33a in the bearing body 19 is axially shorter and tangentially narrower than the other axial female recess 33b in the bearing body 19, wherein the male axial protrusions 35a, 35b at the axial top face of the impeller nut 17 are of essentially identical shape and size. Thereby, the first pair of engagement locations 33a, 35a actually provides a defined axial point of contact between the bearing body 19 and the impeller nut 17. The second pair of engagement locations 33b, 35b with a relatively looser axial and tangential fit only functions as a back-up when the first pair of engagement locations 33a, 35a wears out. During assembly, there are actually two options for mounting the bearing body 19. The bearing body 19 can be rotated by 180° around the rotor axis R so that axial female recess 33a engages with the other male protrusion 35b. This is useful if manufacturing tolerances result in the male axial protrusions 35a, 35b at the axial top face of the impeller nut 17 not being of exactly identical shape and size. If the axial female recess 33a does not fit on the axial male protrusion 35a, the other male protrusion 35a may be tried for fit. The assembly is thus less prone to manufacturing tolerances. It is possible to have N≥1 pair(s) of engagement locations arranged in an N-fold symmetry so that there are N options to find a best fit.

Figure 14:
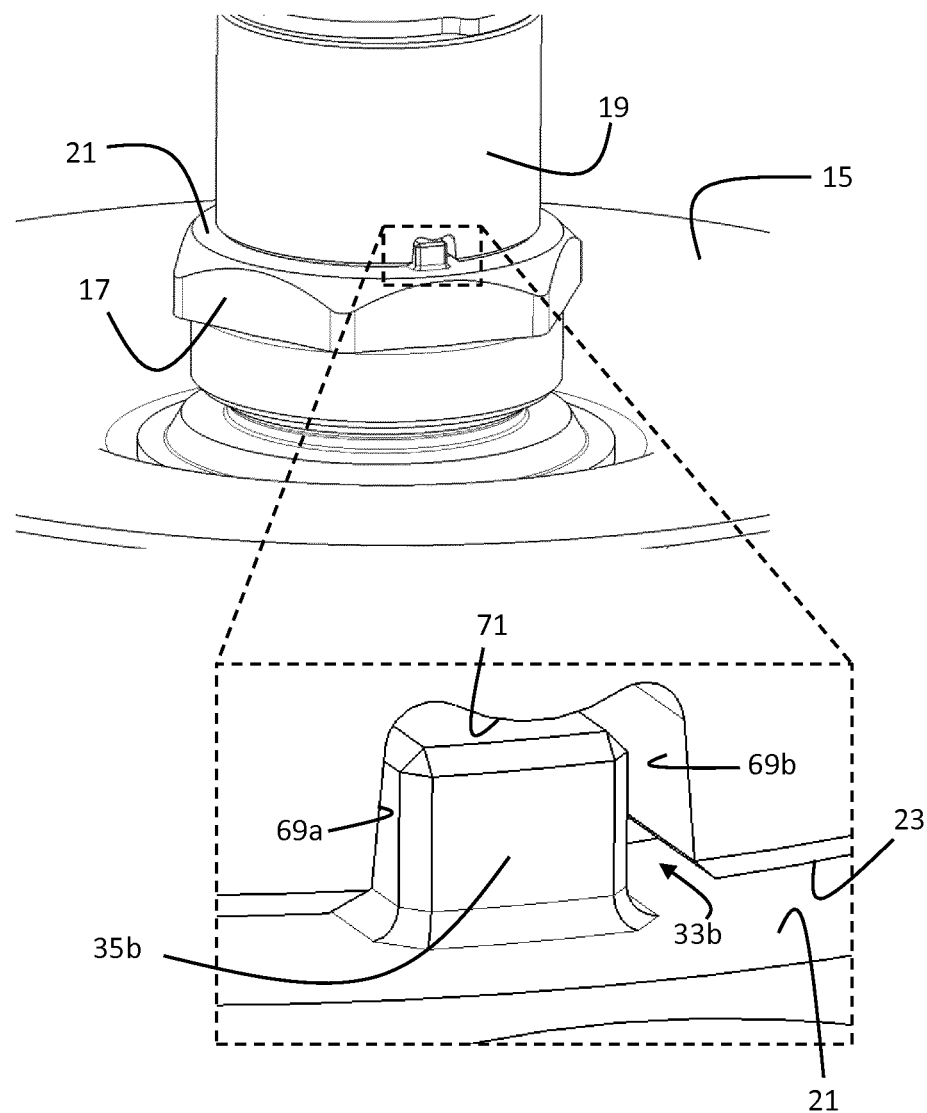
FIG. 14 shows a perspective view on a section of a rotor shaft with assembled impeller, impeller nut, and bearing body as parts of a pump according to an example of an embodiment of the present disclosure with a detail zoom on an engagement location.

FIG. 14 shows the shape of the second back-up pair of engagement locations 33b, 35b with a relatively loose axial and tangential fit. There is no contact between the female recess 33b and the male protrusion 35b as long as the tight fit of the first pair of engagement locations 33a, 35a on the other side (not visible in FIG. 14) wears out. The female recess 33b has a rounded M-shape, wherein lateral faces 69a,b are slightly inclined so that the recess 33b narrows in the direction away from the impeller nut 17. A ceiling of the recess 33b forms a convex axial contact surface 71. The male protrusion 35b has essentially a cuboidal shape.

Figure 15:
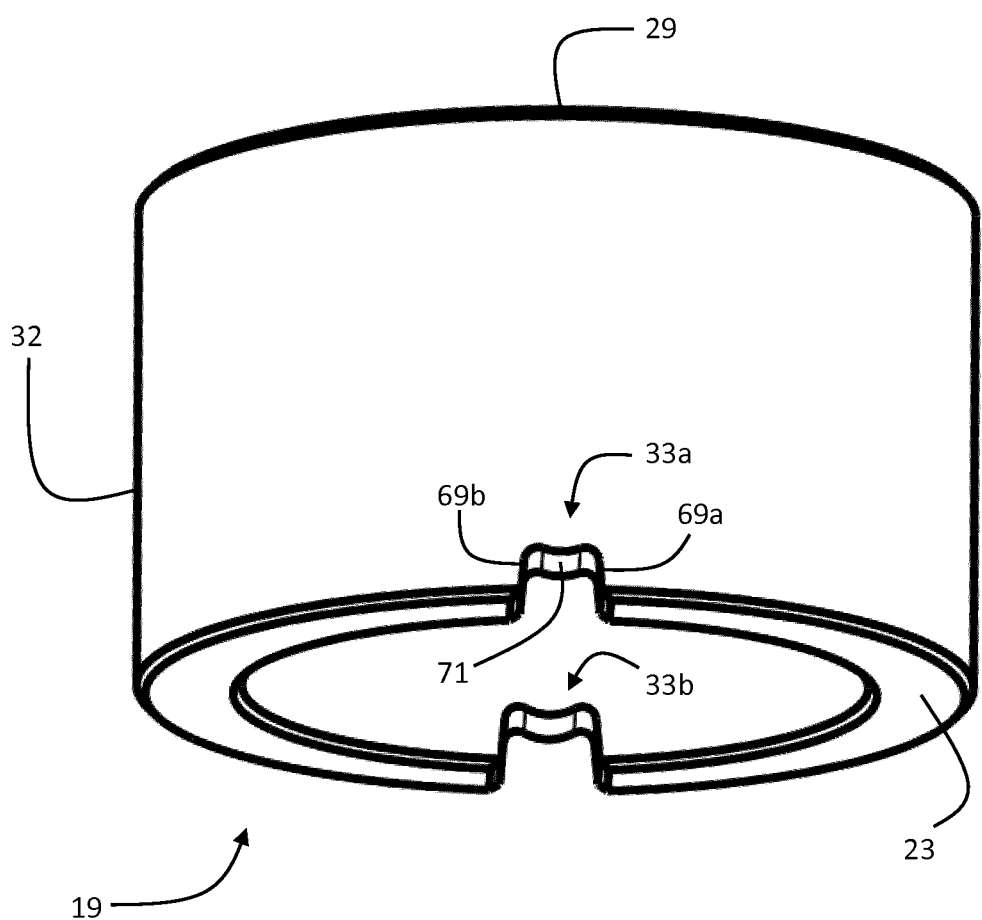
FIG. 15 shows a perspective view on a bearing body a part of a pump according to an example of an embodiment of the present disclosure.

As shown in FIG. 15, where the bearing body 25 is illustrated alone, the first recess 33a has the same shape as second recess 35b as described above for FIG. 14, but smaller both in height and width. The narrowing lateral faces 69a,b and the convex axial contact surface 71 of the first recess 33a allow fora tight fit for rotational fixing and a well-defined single point of axial contact between the bearing body 19 and the impeller nut 17. The corresponding first male protrusion 35a has, analogous to the second male protrusion 35b shown in FIG. 14, essentially a cuboidal shape providing a top face abutting against the convex axial contact surface 71 of the first recess 33a of the bearing body 19.

Where, in the foregoing description, integers or elements are mentioned which have known, obvious or foreseeable equivalents, then such equivalents are herein incorporated as if individually set forth.

Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

LIST OF REFERENCE NUMERALS 1 pump
3 motor housing
5 motor stool
7 pump housing
9 inlet
11 outlet
13 rotor shaft
15 impeller
17 impeller nut
19 bearing body
21 axial stop body
23 axial bottom end of the bearing body
25 locking ring
27 axial stop body
29 axial top end of the bearing body
31 rotor shaft surface
32 radially outer bearing surface
33a,b engagement location in form of a recess
35a,b engagement location in form of a protrusion
37 inner wedge element
39 threaded portion of the impeller
41 first circumferential end portion of the locking ring
43 second circumferential end portion of the locking ring
45 circumferential gap in the locking ring
47 security hook
49 first tooth
51 second tooth
53 third tooth
55 fourth tooth
57a,b,c locking ring segments with teeth
59 stress portion
61 inclined surface of security hook
63 inclined surface of second circumferential end portion
65 impressed groove in the rotor shaft surface
67 axial gap between the bearing body and impeller nut
69a,b lateral faces of engagement location in form of a recess
71 convex axial contact surface
R rotor axis
D direct virtual connecting line between the centre of the circumferential gap and the centre of the stress portion
α central angle of locking ring segments with teeth
β arc length of first and second tooth
γ arc length of third and fourth tooth

The invention claimed is:

1. A pump comprising:
   a rotor shaft extending along a rotor axis;
   a bearing body circumferentially encompassing the rotor shaft and comprising a radially outer bearing surface; and
   a locking ring circumferentially encompassing the rotor shaft and limiting an axial movement of the bearing body relative to the rotor shaft, wherein the locking ring comprises at least two radially inwardly protruding teeth, wherein the locking ring is radially expandable from a locking state to a mounting state against an elastic restoring force of the locking ring, wherein the locking ring is, in the mounting state, positionable at a desired axial position on the rotor shaft, wherein the teeth are configured to press, in the locking state, against a radial outer surface of the rotor shaft by the elastic restoring force of the locking ring, wherein the pump is a single stage or multistage centrifugal pump for pumping a fluid, wherein the fluid to be pumped serves as a lubricant on the radially outer bearing surface of the bearing body.

2. The pump according to claim 1, wherein the locking ring is a first axial stop and further comprising a second axial stop body.

3. The pump according to claim 2, wherein an impeller nut encompassing the rotor shaft for fixing an impeller to the rotor shaft is the second axial stop body.

4. The pump according to claim 2, wherein the second axial stop body defines N≥1 engagement location(s) for preventing a rotational movement of the bearing body relative to the rotor shaft, wherein the bearing body comprises a first axial end facing the locking ring and a second axial end facing away from the locking ring, wherein the second axial end comprises N≥1 engagement location(s) positive-locking with the engagement location(s) of the second axial stop body.

5. The pump according to claim 2, wherein the second axial stop body and the second axial end of the bearing body comprise N≥2 engagement locations, wherein the engagement locations are arranged in an N-fold symmetry with respect to the rotor axis.

6. The pump according to claim 5, wherein a first one of the engagement locations is configured for a positive-locking fit having a lower tolerance in tangential and/or axial direction than a second one of the engagement locations.

7. The pump according to claim 6, wherein at least said first engagement location at the second axial stop body and/or the second axial end of the bearing body comprises a convex axial contact surface for providing an only axial contact between the bearing body and the second axial stop body.

8. The pump according to claim 1, wherein the locking ring defines a circumferential gap between a first circumferential end portion of the locking ring and a second circumferential end portion of the locking ring, wherein the gap is smaller in the locking state than in the mounting state.

9. The pump according to claim 8, wherein the locking ring comprises a security hook extending from the first circumferential end portion and overlapping the circumferential gap, wherein the security hook is configured to hook into the second circumferential end portion of the locking ring for preventing, in the mounting state, a further radial expansion of the locking ring.

10. The pump according to claim 1, wherein the locking ring comprises a stress portion between a first circumferential end portion of the locking ring and a second circumferential end portion of the locking ring, wherein an annulus area of the locking ring has a reduction in size from the stress portion towards the first circumferential end portion and from the stress portion towards the second circumferential end portion.

11. The pump according to claim 10, wherein the teeth are located at M≥2 locking ring segments with a central angle α of 30°≤α≤90°, wherein the locking ring segments are arranged symmetrically with respect to a symmetry plane spanned by the rotor axis and a direct virtual connecting line between a center of a circumferential gap and a center of the stress portion, and wherein the circumferential gap is preferably located centrally in one of the locking ring segments.

12. The pump according to claim 1, wherein the locking ring defines an envelope of maximal radial expansion, wherein the envelope of maximal radial expansion is equal in size to or smaller than the radius of the radially outer bearing surface.

13. The pump according to claim 1, wherein each of the teeth of the locking ring forms an inward blade extending along 15% or less of the circumference of the rotor shaft.

14. The pump according to claim 1, wherein the locking ring comprises a first one of the teeth at a first circumferential end portion of the locking ring and a second one of the teeth at a second circumferential end portion of the locking ring, wherein the first tooth and the second tooth extend over an arc length with a central angle β of less than 20°.

15. The pump according to claim 14, wherein the locking ring comprises a third one of the teeth and a fourth one of the teeth at a stress portion between the first circumferential end portion of the locking ring and the second circumferential end portion of the locking ring, wherein the third tooth and the fourth tooth each extend over an arc length with a central angle γ of less than 60°.

16. The pump according to claim 1, wherein the locking ring is configured to be bathed in the fluid to be pumped so that the fluid provides an abrasive environment facilitating, in the locking state, an impressing of the teeth of the locking ring into the radial outer surface of the rotor shaft.

17. The pump according to claim 1, wherein the teeth are harder than the radial outer surface of the rotor shaft.

* * * * *